Figure 1:
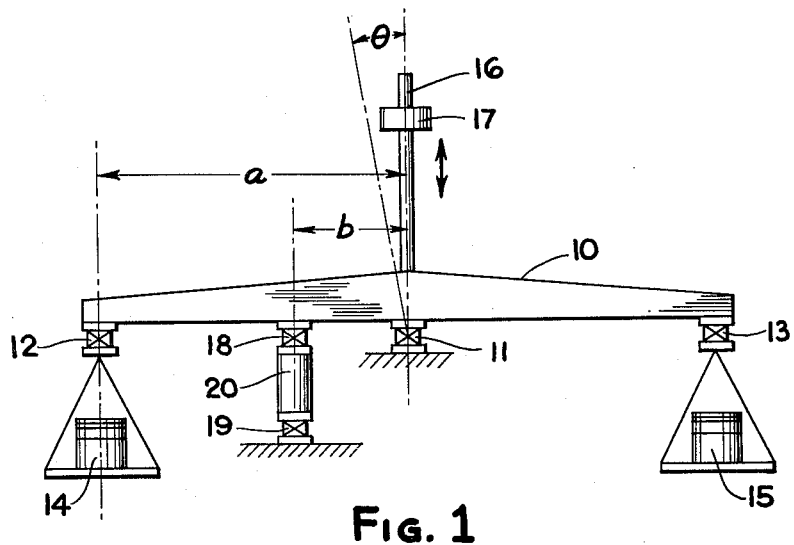

July 9, 1963     A. N. ORMOND     3,096,638

BEAM CALIBRATOR

Filed Dec. 23, 1959

INVENTOR
ALFRED N. ORMOND
BY *Elliott & Pastoriza*
ATTORNEYS

United States Patent Office 3,096,638
Patented July 9, 1963

3,096,638
BEAM CALIBRATOR
Alfred N. Ormond, 9107 5th Ave., Inglewood, Calif.
Filed Dec. 23, 1959, Ser. No. 861,524
4 Claims. (Cl. 73—1)

This invention relates generally to calibrating instruments and more particularly to a beam balance type calibrator employing dead weights for the calibration of load cells.

Load cells of the type under consideration generally provide an output signal proportional to a loading applied to the cell. Usually this is accomplished by means of strain gauges which are sensitive to deformation of structural portions of the load cell. Such deformation of the load cell, however, is extremely small. To calibrate such load cells, it has been the practice to employ dead weights load cells, it has been the practice to employ dead weights and simply increase the dead weight on the cell until loaded to its contemplated maximum value, calibrating the cell as the operation proceeds.

The use of dead weights is without question the most accurate means known at the present time for calibration since the only possible error of any significance is determined by the precision of the weights themselves. Such weights as provided by the Bureau of Standards are extremely accurate and ordinarily present no problem except in cases where loads of high magnitude, for example of the order of 300,000 to 1,000,000 pounds are to be measured. In these instances, the number of dead weights required would be prohibitive not only from the standpoint of expense but from the standpoint of storage for the weights and the physical problems of actually loading the cells.

Accordingly, to carry out the calibration of load cells designed for extremely large loads it is desirable to introduce a mechanical amplification factor for the weights. This amplification coupled with a binary weight system will minimize the number and size of the weights necessary to effect the desired calibration. However, the use of mechanical amplification introduces other possible errors. Primarily, these are a consequence of the following: First, friction developed at the pivots in the mechanical system itself; second, changes in the reacting forces in the mechanical system when under load; third, introduction of shear and torque forces as a consequence of reaction of certain components in the load cell when loaded, as well as by the structure effecting the mechanical amplification; fourth, difficulty in determining the sensitivity of the overall system; and fifth, difficulty in determining the exact amplification factor under load, the loading resulting in dimensional changes in the amplification system. It is because of these errors in prior art systems that the use of the simple dead weight system is still preferable.

With the foregoing in mind, it is a primary object of the present invention to provide a greatly improved calibrating instrument which incorporates a mechanical advantage means to the end that large numbers and sizes of weights are not necessary for the calibration of load cells designed for relatively high loads, and in which most of the foregoing errors introduced by the use of mechanical advantage are substantially eliminated.

Another important object is to provide an improved calibrating instrument which meets the foregoing object and yet can be manufactured for considerably less expense than devices performing similar functions heretofore proposed.

Briefly, these and many other objects and advantages of this invention are attained by applying the principles of the conventional beam balance, but in lieu of a knife edge or other fulcrum structure, a flexure unit is employed to mount the beam. The stiffness factor introduced by the flexure in turn is eliminated by the use of an inverted pendulum acting as a counter-poise. The ends of the beam also include suitable flexures for supporting dead weights. An additional flexure support means is secured to the beam at a point between one end and the fulcrum thereof for applying a load to the load cell to be calibrated. With this arrangement, there is provided a mechanical amplification determined by the ratio of the distance between the fulcrum and one end and the fulcrum and the point of securement of the flexure support for the load cell. Further, the cell may be tested in either compression or tension depending upon which end of the beam is loaded.

To minimize the effects of shear or torques introduced as a consequence of the use of the balance and as a result of reactions within the load cell itself on the balance, a platen structure is provided and supported by guide flexures to constrain its movement to a vertical direction. This platen is connected to the flexure support means on the beam and the load cell in turn is connected to the platen.

Another important feature of the invention contemplates means for determining the sensitivity and amplification factor of the overall structure under load conditions. This is accomplised by employing another beam balance in back-to-back relationship to the first beam balance, the load cell to be calibrated being connected between suitable flexure means, in turn respectively connected to the two beams. By this arrangement, the beams are tied together through the medium of the load cell itself and thus motion as a consequence of any unbalance can be observed while the load cell is subjected to full load conditions. Both the sensitivity and the amplification factor can be determined to a high degree of accuracy by observing and measuring the motion and displacement of the beams under these conditions.

Figure 2:
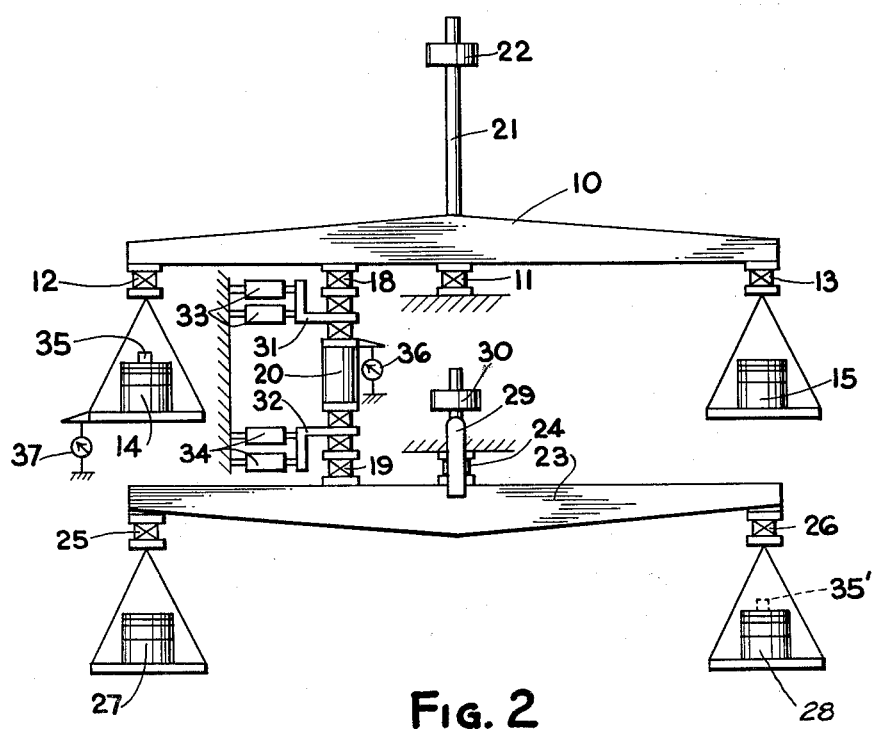

A better understanding of the invention as well as many other features and advantages thereof will be had by now referring to the accompanying drawings in which:

FIGURE 1 is a schematic showing of a beam balance incorporating many of the features of this invention; and, FIGURE 2 is another schematic diagram illustrating a complete calibration system in accordance with the invention.

Referring first to FIGURE 1, there is shown a beam balance 10 having a flexure fulcrum 11 and end flexures 12 and 13 for supporting dead weights.

Because of the use of a flexure for the fulcrum at 11, there must be provided means for cancelling out the stiffness factor of the flexure itself. This can be accomplished by the use of an inverted pendulum as indicated at 16 which includes a movable mass 17. As shown, the pendulum extends normally from the beam and is in alignment with the flexure 11. A gravitational torque as a consequence of the mass 17 will be applied to the flexure 11 when the beam 10 rotates from a horizontal position through an angle such as indicated by the angle $\theta$. This gravitational component is proportional to sin $\theta$ whereas the stiffness reaction of the flexure itself is proportional to the angle $\theta$. The sine of $\theta$ is substantially equal to $\theta$ over very small values and thus substantially complete cancellation of the stiffness factor is achieved. As a result, the beam 10 will tend to remain in any set position resulting in a zero spring force structure. Exact cancellation of the flexure stiffness factor in accord with the foregoing is effected by experimentally moving the weight 17 up and down the inverted pendulum arm 16 until the beam 10 will not oscillate.

The above arrangement thus provides a substantially friction free pivot for the beam 10 and removes errors introduced heretofore as a consequence of looseness and friction when conventional type knife edges or pivots are employed.

A flexure means 18 is secured to the beam 10 at a point between one end of the beam and the fulcrum 11. This flexure in conjunction with flexure 19 serves to transmit loading from the beam to the load cell 20 to be calibrated. If the distance between the fulcrum 11 and the one end is indicated by the letter "a" and the distance of the flexure support 18 from the fulcrum, indicated by the letter "b," the amplification of the loading applied by the dead weights 14 is given by the ratio of $$\frac{a}{b}$$

If the amplification factor is of the order of 50 to 1, the beam balance described in FIGURE 1 will enable load cells to be calibrated under extremely high loads. While this structure is free from errors due to friction by the use of the flexure 11, and also free of errors as a consequence of gravitational forces and stiffness reaction in the flexure by the use of the counter-poise mass 17, errors can still be introduced. Some of these additional errors result from torque and shear forces interacting between the load cell 20 and the beam under axial compression or tension loads.

The foregoing shear and torque loads can be eliminated from affecting in any way the calibration of the load cell by employing a modified type of flexure support means for the load cell. This modified type of flexure support includes a platen structure which is secured to the flexure support on the beam and also to suitable laterally extending guide flexures which constrain movement of the platen to a vertical direction.

In addition to the minimizing of the effects of shear and torque forces, there is still the problem of determining the sensitivity of the balance under full load conditions. In a conventional balance this problem is not difficult since motion of the beam can be observed when weights are stacked on one end of the balance and compared with the weight stacked on the other end of the balance. When a load cell is in position, however, it is almost impossible to observe any motion of the beam during the loading and thus it is not known what part of the loading is being transmitted through the load cell and what part is being absorbed by possible friction or deformation losses in the balance itself. For example, the stiffness factors of the flexures vary under changes in load and can thus change the sensitivity of the beam. In addition, the amplification factor may change due to dimensional variations under extreme loading conditions.

In order to minimize all of the foregoing sources of error, the balance of FIGURE 1 can be modified into a compound beam balance structure as shown in FIGURE 2. In FIGURE 2, identical components as shown in FIGURE 1 are designated by the same numerals. As shown, the inverted pendulum constituting the counterpoise for the beam 10 of FIGURE 2 is different from that shown in FIGURE 1 as indicated by the numeral 21 and the increased mass 22. In addition, there is provided a second beam balance 23 in back-to-back relationship to the first beam 10. This second beam balance 23 is also provided with a flexure fulcrum 24 and end flexures 25 and 26 for supporting dead weights 27 and 28 respectively. A second inverted pendulum indicated at 29 and 30 serves as a counter-poise for the flexure 24 and other support flexures in the system to cancel out the stiffness factors thereof.

Rather than supporting the load cell 20 directly between the flexure supports 18 and 19, there are provided platens 31 and 32 which are secured to the flexures 18 and 19. These latter flexures in turn are secured to the beams 10 and 11 at corresponding positions between the ends and fulcrum flexures. Platens 31 and 32 include lateral guiding flexures 33 and 34 stationarily secured as shown for respectively constraining movement of the platens to a vertical direction. The load cell 20 is secured by suitable flexures between the platens 31 and 32. By this arrangement, shear and torque forces are eliminated from affecting the loading of the cell 20 because of the constraints on the platens 31 and 32 to movement in the direction of the applied compression or tension forces. The added stiffness introduced by the guide flexures 33 and 34 can be compensated by adjustment of the modified counter-poise weights 22 and 30 for the beams 10 and 23 respectively.

In the operation of the calibrator of FIGURE 2, the beam 23 is loaded simultaneously with the beam 10. For example, if the load cell 20 is to be calibrated in compression, the weights 15 on the right hand end of beam 10 and weights 27 on the left hand end of beam 23 are removed and the weights 14 are applied to the left hand end of beam 10. Simultaneously, exactly similar weights are loaded on the right hand end of the beam 23 as indicated at 28. The flexure support 19 for the platen 32 is secured to the beam 23 at a point between its end and flexure 24 corresponding to the point of securement of the flexure 18 on the beam 10. Thus loading simultaneously of the beams 10 and 23 as described will result in a compression force being applied to the load cell 20.

After complete loading, and with the beams in balance, and equal weights 14 and 28 loading the structure, it is now possible to determine the sensitivity of the system. This is accomplished by adding in increments small weights such as weight 35 until an initial movement of the beams is evident. At this point, the additional incremental weights 35 may be removed from the weights 14 and added to the weights 28 as at 35' to observe if motion then takes place in the other direction. The incremental weights may be decreased until no motion can be detected and at this time the value of the weights 35 is exactly equal to the friction or other losses in the system thus providing an indication of the sensitivity. In other words, by the use of the back-to-back balance 23, all of the sensitivity of the overall system can be determined since it is possible to observe motion of the beams which situation was not possible in the setup described in FIGURE 1.

It will also be evident that any additional weight thus added to the weights 14 will necessarily pass through the load cell 20 since this is the only element connecting the beams together thus enabling extremely accurate calibration to take place.

Finally, any change in the amplification factor as a consequence of loading can be determined by the use of the back-to-back beam structure. As mentioned, this amplification factor may change due to structural deformations under loads resulting in changes of the dimensions "a" and "b" of FIGURE 1. In determining the amplification factor, accordingly, there may be provided simple displacement indicators 36 and 37 secured respectively to the load cell 20 and the pan or other support for the dead weights 14. The ratio of these relative displacements when one end of the beam 10 is moved will then give an exact value for the amplification factor.

It will be understood of course that once the balance 10 itself has been checked out under load with respect to the amplification factor by means of the back-to-back balance 23 and once the sensitivity thereof has been determined by the use of the incremental weights 35, the lower balance is no longer necessary. The cells can then be accurately calibrated by means of only one balance, the lower platen 32 and guide flexures 34 being removed and the lower flexure support for the cell being secured to a stationary structure.

From the foregoing, it will be evident that the present invention provides a greatly improved calibrating system which provides the advantages of an amplification factor to the end that a corresponding decrease in the number and sizes of dead weights required is assured. More-over, the disadvantages heretofore encountered in connection with amplification factor type calibrating systems have been virtually eliminated by use of the flexures as pivots, the use of the guide flexures to eliminate the effects of torque and shear forces, and finally the use of a back-to-back balance for enabling determination of the overall sensitivity and amplification factor of the system under loaded conditions.

While the invention has been described in connection with the calibration of load cells, it will be evident that the principles thereof are applicable to the calibration of any type of structure wherein great accuracy under very high loading conditions is required. Accordingly, the invention is not to be thought of as limited to the particular application set forth merely for illustrative purposes.

What is claimed is:

1. A beam balance calibrator for load cells comprising: a beam; a flexure fulcrum secured to a stationary structure for said beam; an inverted pendulum secured to said beam in vertical alignment with said flexure fulcrum when said beam is horizontal to act as a counterpoise and cancel the stiffness factor of said flexure; means at each end of said beam for receiving dead weights; flexure means secured to said beam at a point between one end of said beam and said fulcrum, said point being closer to said fulcrum than to said one end to provide a mechanical weight amplification at said point when said one end of said beam is weighted; a platen secured to said flexure means for connection to a load cell; and laterally extending guide flexures connected from said stationary structure to said platen for constraining movement thereof to a vertical direction whereby torque and shear forces are excluded from affecting loading of said load cell during calibration thereof by adding weights to one end of said beam.

2. A beam balance calibrator comprising, in combination: a horizontal first beam having a first flexure fulcrum secured to a stationary structure; means at the ends of said beam for supporting dead weights; a first inverted center pendulum extending upwardly normally from said beam and in alignment with said flexure fulcrum to act as a counter-poise therefor; a first load cell flexure support means secured to said beam between one end thereof and said fulcrum at a point closer to said fulcrum than to said one end to provide a load amplification when a load cell is secured to said flexure support means, and one end of said beam is weighted with said dead weights, and lateral guide flexures connected from said stationary structure to said flexure support means to constrain said load cell to movement in a vertical direction.

3. The subject matter of claim 2, including a second beam having a second flexure fulcrum secured to said stationary structure in vertical alignment with said first flexure fulcrum for said first beam, said second beam being in back-to-back relationship with said first beam; means at the ends of said second beam for supporting dead weights; a second inverted center pendulum extending upwardly normally from said second beam in alignment with said second flexure fulcrum to act as a counterpoise therefor; and a second load cell flexure support means secured to said second beam between one end thereof and said second fulcrum in a position corresponding to the position of said first load cell flexure support means so that said first and second flexure support means are in vertical alignment and the sensitivity of said calibrator can be determined under load when a load cell is secured between said first and second flexure support means by simultaneously loading said one end of said first beam with weights and the other of said ends of said second beam with weights and observing motion of said beams when incrementally loading one of said ends more than the other.

4. The subject matter of claim 3, including means for measuring the displacement of one of said ends and the displacement of said load cell when said beams move under load, whereby the amplification factor may be determined by the ratio of said displacements.

References Cited in the file of this patent

UNITED STATES PATENTS

| | | |
|---|---|---|
| 262,905 | Roeder | Aug. 15, 1882 |
| 1,169,929 | Conway | Feb. 1, 1916 |
| 2,672,755 | Hohner | Mar. 23, 1954 |